(12) United States Patent
Gale et al.

(10) Patent No.: US 9,172,597 B2
(45) Date of Patent: Oct. 27, 2015

(54) DATA COMBINER AND SPLITTER

(75) Inventors: Alan A. Gale, Windham, ME (US); Alan M. Foskett, Mansfield, MA (US); Ronald C. Rippel, South Easton, MA (US)

(73) Assignee: Invensys Systems, Inc., Foxboro, MA (US)

( * ) Notice: Subject to any disclaimer, the term of this patent is extended or adjusted under 35 U.S.C. 154(b) by 895 days.

(21) Appl. No.: 13/096,762

(22) Filed: Apr. 28, 2011

(65) Prior Publication Data

US 2012/0275465 A1    Nov. 1, 2012

(51) Int. Cl.
*H04L 12/28*    (2006.01)
*H04L 12/24*    (2006.01)

(52) U.S. Cl.
CPC .................................... *H04L 41/042* (2013.01)

(58) Field of Classification Search
None
See application file for complete search history.

(56) References Cited

U.S. PATENT DOCUMENTS

| | | | |
|---|---|---|---|
| 6,718,383 B1 * | 4/2004 | Hebert | 709/224 |
| 6,742,136 B2 | 5/2004 | Christensen et al. | |
| 7,012,905 B2 * | 3/2006 | Haumont et al. | 370/331 |
| 7,940,812 B2 * | 5/2011 | Yu et al. | 370/532 |
| 8,284,717 B2 * | 10/2012 | Voyer et al. | 370/328 |
| 2005/0238025 A1 * | 10/2005 | Hay et al. | 370/395.1 |

\* cited by examiner

*Primary Examiner* — Willie J Daniel, Jr.
(74) *Attorney, Agent, or Firm* — Thomas J. Roth, Esq.

(57) ABSTRACT

In a network coupling redundant controllers to a control system, an electronic device is provided. The device comprises a first interface coupled to the control system addressed using a unique medium access control (MAC) address, a second interface coupled to a first redundant controller, and a third interface coupled to a second redundant controller. The device receives a first message via the first interface and transmits the first message via the second interface and via the third interface. The device receives a second message via the second interface and transmits the second message via the first interface. The device receives a third message via the third interface and transmits the third message via the first interface.

18 Claims, 3 Drawing Sheets

DATA COMBINER AND SPLITTER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Process control systems may be implemented to automatically control industrial processes based on pre-defined logic and/or rules. Industrial processes may be carried out by motors, valves, heaters, pumps, and the like, which may be referred to as process devices or field devices, in manufacturing plants, refineries, food processing plants, and other plants. The process control systems may monitor parameters and/or properties of on-going processes by receiving outputs from sensors coupled to the processes, for example temperature sensors, pressure sensors, motion sensors, weight sensors, density sensors, flow rate sensors, and other sensors. Automated control devices, for example controllers, may adjust and control process devices based on the sensed parameters and properties based on pre-defined logic and/or command inputs from, for example, a human machine interface. To provide for higher reliability and/or safety, controllers may be deployed redundantly, such that a failure of one controller may be compensated for by another controller, for example by the other controller assuming responsibility for controlling the subject process.

SUMMARY

In an embodiment, an electronic device is disclosed as part of a network coupling a plurality of redundant controllers to a control system. The electronic device, comprises a first interface coupled to the control system, wherein the first interface is addressed using a unique medium access control (MAC) address, a second interface coupled to a first redundant controller, and a third interface coupled to a second redundant controller. The electronic device receives a first message from the control system via the first interface and transmits the first message via the second interface to the first redundant controller and via the third interface to the second redundant controller. The electronic device receives a second message from the first redundant controller via the second interface and transmits the second message via the first interface to the control system. The electronic device receives a third message from the second redundant controller via the third interface and transmits the third message via the first interface to the control system.

In an embodiment, an electronic communication device is disclosed. The electronic communication device comprises a first PHY chip, a second PHY chip, and a third PHY chip. The electronic communication device further comprises a first interface coupled to a physical layer interface of the first PHY chip, a second interface coupled to a physical layer interface of the second PHY chip, and a third interface coupled to a physical layer interface of the third PHY chip. A link layer interface of the first PHY chip is coupled to each of a link layer interface of the second PHY chip and a link layer interface of the third PHY chip. The device receives a first message via the first interface and transmits the first message via the second interface and the third interface, receives a second message via the second interface and transmits the second message via the first interface, and receives a third message via the third interface and transmits the third message via the first interface.

In an embodiment, a method of transmitting communication signals in a redundant controller environment is disclosed. The method comprises receiving a first signal at a physical layer interface of a first PHY chip, wherein the first signal embeds a clock signal, generating a second signal based on stripping the embedded clock signal from the first signal, transmitting the second signal from a link layer interface of the first PHY chip to a link layer interface of a second PHY chip and to a link layer interface of a third PHY chip, generating by the second PHY chip a third signal based on the second signal, transmitting the third signal from a physical layer interface of the second PHY chip, generating by the third PHY chip a fourth signal based on the second signal, and transmitting the fourth signal from a physical layer interface of the third PHY chip.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
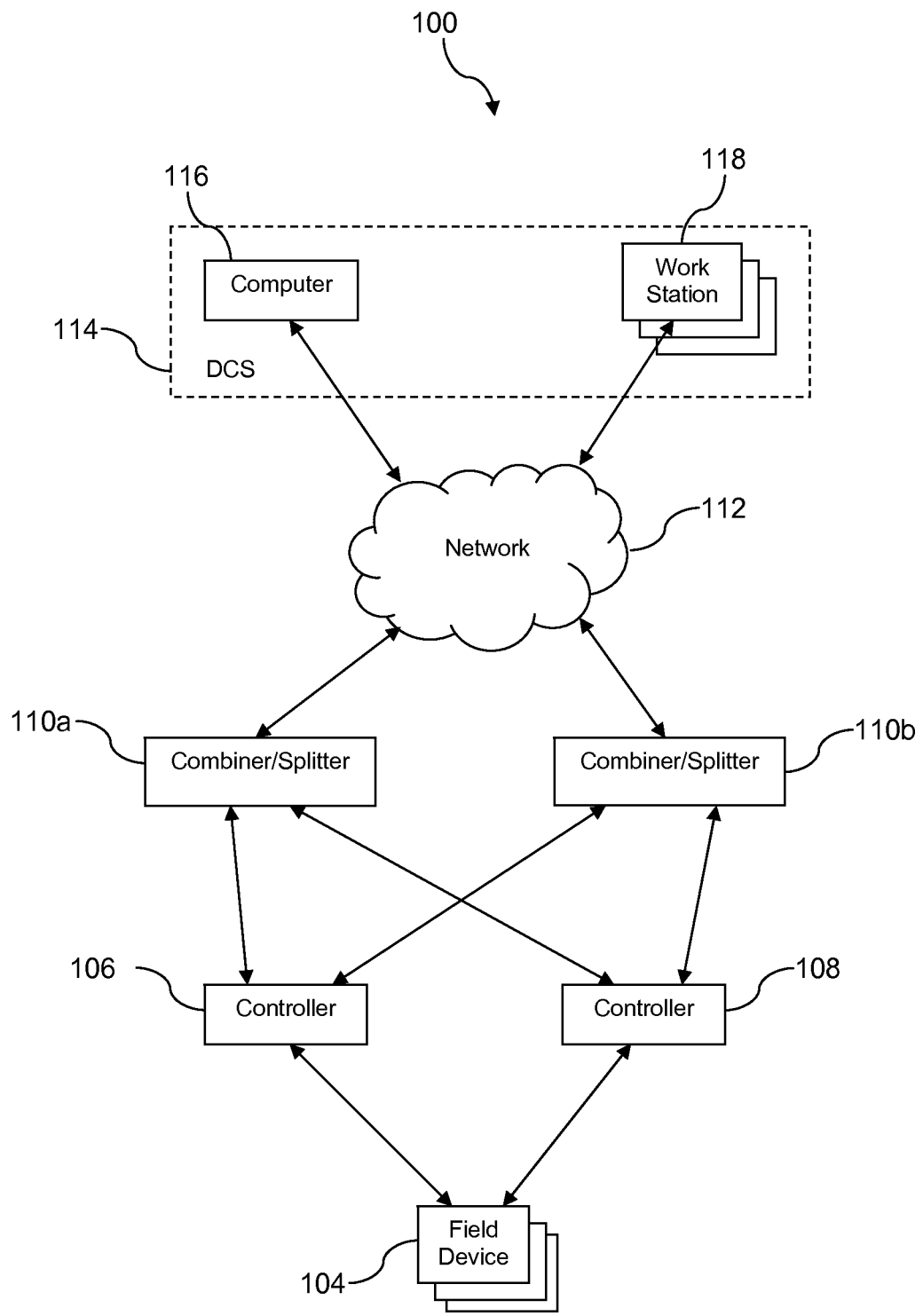
FIG. 1 is a block diagram of a process control system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An electronic combiner/splitter device is taught herein. In an embodiment, the device receives a communication from a higher tier control system and passes this communication to a plurality of redundant controllers. This function may be referred to as splitting. One of the redundant controllers operates in a primary mode and commands one or more field devices, for example a valve in a refinery, and communicates with the higher tier control system. The other redundant controllers monitor communications, execute the same control program that the primary controller executes, but do not issue commands to the field devices and do not transmit messages to the higher tier control system. The other redundant controllers remain ready to assume the primary mode or operation, for example should the primary controller experience a failure. The electronic combiner/splitter also receives a communication from the redundant controllers and passes this communication to the higher tier control system. This function may be referred to as combining. It is understood that the teachings of the present disclosure may be usefully applied to applications other than communication in a plant control environment having redundant controllers.

The electronic combiner/splitter device promotes the higher tier control system interacting with the plurality of redundant controllers via a single medium access control (MAC) address. Stated another way, from the view of the higher tier control system, the plurality of redundant controllers may be seen as a single MAC address. Being able to address the plurality of redundant controllers via a single MAC address may save the costs of including additional ports in the system design. For example, at the time of filing, a port that is suitable for fiber optic communication in a high temperature environment, for example in a glass manufacturing plant or in an oil refinery, may cost about $50. Additionally, this may save the step of the higher tier control system learning a new MAC address when the primary role swaps between the redundant controllers.

In an embodiment, the combiner/splitter device comprises a PHY chip having a physical layer interface coupled to the higher tier control system. This PHY chip may be referred to as a network PHY chip, because the PHY chip may be coupled to the higher tier control system via a network. In an embodiment, the combiner/splitter device comprises a plurality of PHY chips each having a physical layer interface coupled to one of the redundant controllers. This plurality of PHY chips may be referred to as controller PHY chips, because each of these controller PHY chips is coupled to one of the redundant controllers. A link layer interface of each of the controller PHY chips is coupled to a link layer interface of the network PHY chip. This may be referred to as connecting the network PHY chip to the controller PHY chips in a back-to-back configuration. The combiner/splitter device may be composed of PHY chips so as to couple between any combination of physical communication mediums. For example, one variant of the combiner/splitter can connect to a fiber optic line coupled to the higher tier control system and connect to metallic transmission lines coupled to the redundant controllers. Alternatively, another variant of the combiner/splitter can connect to a metallic transmission line coupled to the higher tier control system and connect to metallic transmission lines coupled to the redundant controllers. Alternatively, another variant of the combiner/splitter can connect to a fiber optic line coupled to the higher tier control system and connect to fiber optic lines coupled to the redundant controllers.

A PHY chip connects between a link layer communication, for example Ethernet communication, and a physical layer communication, for example an optical fiber or metallic transmission line. The PHY chip provides bridging functionality between two dissimilar communication layers. In some contexts, a PHY chip may be said to strip off a timing signal embedded in an encoded physical layer signal by converting the signal to a link layer representation. In an embodiment, the use of the PHY chips may adapting the timing among the PHY chips based on the timing signal stripped off of the physical layer signal. Additionally, the PHY chip may be said to strip out and/or remove an idle tone when converting the physical layer signal to a link layer signal, thereby avoiding the task of developing a design to strip out this idle tone. It is an insight taught by the present disclosure that the back-to-back configuration of the PHY chips can provide several of these design solutions with little extra design effort invested by the implementer.

Turning now to FIG. 1, a control system 100 is described. The system 100 comprises one or more field devices 104, a plurality of redundant controllers, for example a first controller 106 and a second controller 108, one or more combiner/splitter devices 110, a network 112, and a distributed control system (DCS) 114. In an embodiment, the distributed control system 114 may comprise a computer 116 executing a higher tier control application and one or more workstations 118. It is understood that the system 100 may be implemented in other configurations. For example, while the system 100 as represented in FIG. 1 comprises two redundant controllers 106, 108, in another embodiment the system 100 may comprise three or more redundant controllers. While system 100 is illustrated as having a first combiner/splitter 110a and a second combiner/splitter 110b, in another embodiment, the system 100 may have only one combiner/splitter 110, three combiner/splitters 110, or yet more combiner/splitters 110.

The network 112 may comprise a private network, a public network, or a combination thereof. Under normal operating conditions, the distributed control system 114 may communicate with the redundant controllers 106, 108 via the network 112 and via one of the combiner/splitters, for example via the first combiner/splitter 110a. In the embodiment of the system 100 illustrated in FIG. 1, two combiner/splitters 110 are provided against the eventuality that one of the combiner/splitters 110 may fail. In the instance that the selected combiner/splitter 110 is detected to have failed, the distributed control system 114 or the network 112 can redirect communications via the alternative combiner/splitter 110.

The computer 116 may execute a higher tier control program. For example, the higher tier control program may monitor parameters of a controlled process, for example an oil refining process, and determine desirable set-points of the controlled process. The work stations 118 may promote an operator of the control system 100 inputting commands and/or process values, and the higher tier control program may execute based on these commands and/or process values. The computer 116 may receive information from one of the redundant controllers 106, 108 operating in a primary role (the other redundant controller 106, 108 may be said to be operating in a shadow role). This information may be sensor information from the field devices 104 that has been received and then transmitted by the controller 106, 108 operating in the primary role.

A communication message or signal that is transmitted from the distributed control system 114 to the first controller 106, for example where the first controller is operating in the primary role, may be addressed to a medium access control (MAC) address of the first combiner/splitter 110. The message is first transmitted to the network 112, and the network routes the message to the first combiner/splitter 110 based at least in part on the MAC address of the first combiner/splitter 110. For example, a conventional switch device (not shown) in the network 112 switches the message to the first combiner/splitter 110 based on the MAC address encapsulated in the message. The combiner/splitter 110 receives the message, splits the message into a pair of messages, and sends these messages to each of the first controller 106 operating in primary mode and the second controller 108 operating in shadow mode.

The message is acted upon by the first controller 106, for example adapting the control signals it sends to one of the field devices 104 based on a new set point contained in the message. The message is received but not acted upon by the second controller 108. The second controller 108 receives the same messages that the first controller 106 receives from the distributed control system 114, monitors the communications received by the first controller 106 from the field devices 104, and executes the same controller program that the first controller 106 executes. This shadowing by the second controller 108 of the state and processing of the first controller 106 allows the second controller 108 to rapidly assume the role of the primary controller in the event of a failure of the first controller 106.

The first controller 106 may send a message to the distributed control system 114 via the first combiner/splitter 110a. The first controller 106 sends the message to the first combiner/splitter 110a, the first combiner/splitter 110a transmits the message to the network 112, for example to a conventional switch device in the network 112, and the network 112 transmits the message to the distributed control system 114. The message may include state and/or sensor information from the field devices 104. For further details about a redundant process controller system, see U.S. patent application Ser. No. 13/029,102, filed Feb. 16, 2011, entitled "System and Method for Fault Tolerant Computing Using Generic Hardware," by Alan A. Gale, et al., which is hereby incorporated by reference in its entirety.

Figure 2:
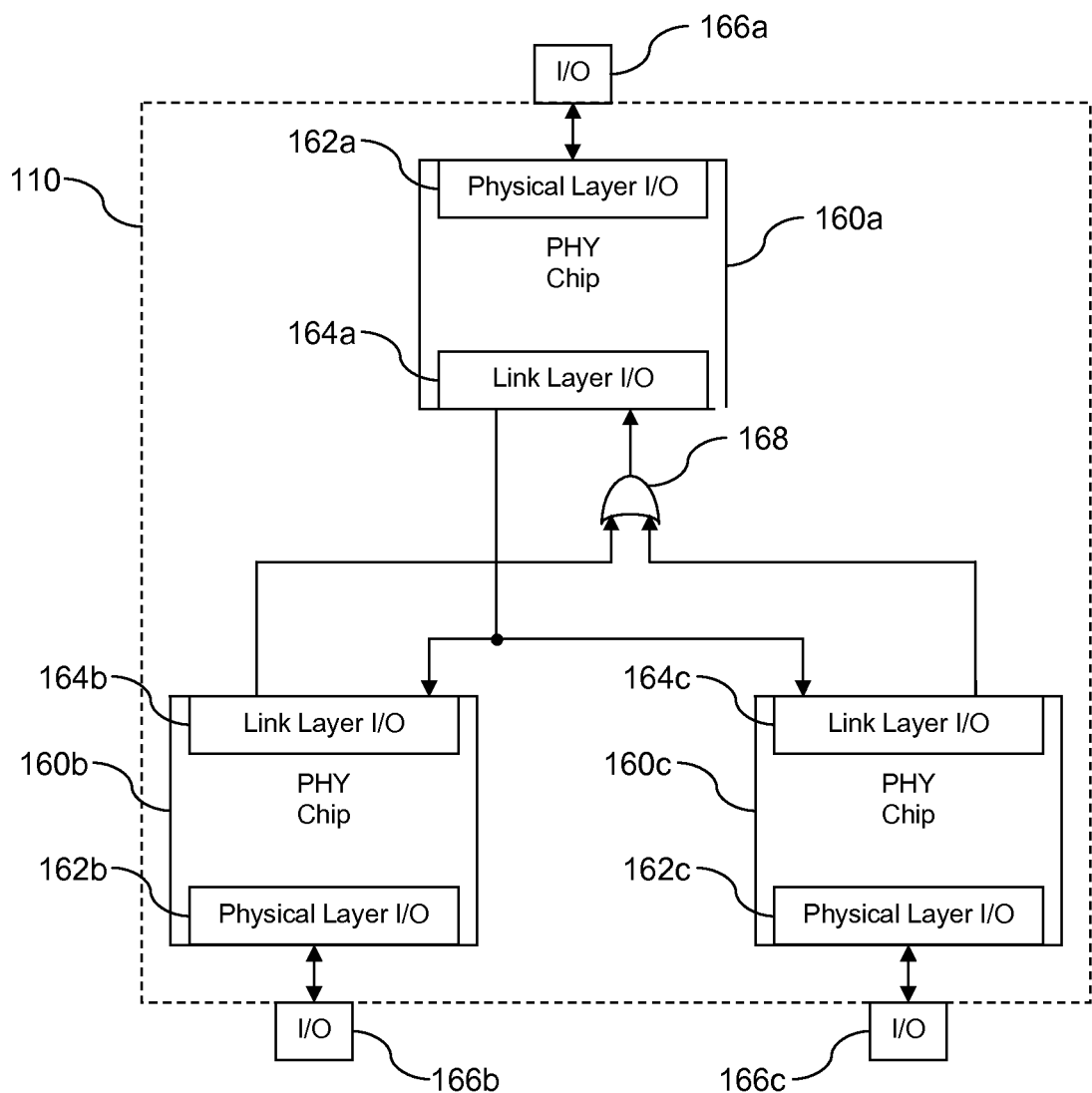
FIG. 2 is a block diagram of a combiner/splitter according to an embodiment of the disclosure.

Turning now to FIG. 2, further details of the combiner/splitter 110 are described. In an embodiment, the combiner/splitter 110 comprises three PHY chips 160—a first PHY chip 160a, a second PHY chip 160b, and a third PHY chip 160c. In some contexts, the first PHY chip 160a may be referred to as the network PHY chip, because the first PHY chip 160a may couple to the network 112 discussed above with reference to FIG. 1. In some contexts, the second PHY chip 160b and the third PHY chip 160c may be referred to as controller PHY chips, because the PHY chips 160b, 160c may couple to the controllers 106, 108. The first PHY chip 160a may couple to the network 112 via a first media coupler 166a; the second PHY chip 160b may couple to the first controller 106 via a second media coupler 166b; and the third PHY chip 160c may couple to the second controller 108 via a third media coupler 166c. The combiner/splitter 110 may be provided on a baseplate for ease of installation in a plant environment.

Each of the PHY chips 160 comprises a physical layer interface 162 connected to the media coupler 166 and a link layer interface 164. The physical layer interface 162 promotes communication in a physical layer protocol, for example, according to an encoded fiber optic physical layer protocol, for example a Manchester encoded physical layer protocol. The link layer interface 164 promotes communication in a link layer protocol. The PHY chips 160 may be selected to support any desired physical layer protocol, and because the link layer interfaces 164 of the PHY chips 160 are coupled to each other, communications may be received by one PHY chip 160 according to a first physical layer protocol and transmitted by another PHY chip 160 according to a second, different physical layer protocol. In some contexts, the PHY chips 160 may be said to be cross-connected or connected back-to-back.

In some contexts, the PHY chips 160 may be said to strip off a timing signal embedded in an encoded physical layer signal by converting the signal to a link layer representation. In some cases, the PHY chip 160 may adapt its timing based on the timing signal stripped off of the physical layer signal. Additionally, the PHY chips 160 may be said to strip out and/or remove an idle tone when converting the physical layer signal to a link layer signal.

In an embodiment, the first physical layer interface 162a of the first PHY chip 160a and the first media coupler 166a provide for communication over a fiber optic fiber back to the network 112. The fiber optic fiber may comprise a glass core surrounded by cladding; the cladding may be surrounded by a buffer; and the buffer may be surrounded by a jacket. In another embodiment, however, the fiber optic fiber may have another physical structure.

In an embodiment, the second physical layer interface 162b of the second PHY chip 160b and the second media coupler 166b provide for communication over a metallic transmission line back to the first controller 106. In this embodiment, the third physical layer interface 162c of the third PHY chip 160c and the third media coupler 166c provide for communication over a metallic transmission line back to the second controller 108. In an embodiment, the second physical layer interface 162b of the second PHY chip 160b and the third physical layer interface 162c of the third PHY chip 160c plug into a backplane or other printed wiring board, contacting metallic transmission lines printed on the backplane or printed wiring board. The metallic transmission lines may couple to metal cables that couple in turn to the controllers 106, 108. The metal cable may comprise a twisted pair of wires, for example CAT5 cable. In an alternative embodiment, the second physical layer interface 162b and the second media coupler 166b provide communication over a fiber optic fiber back to the first controller 106 and the third physical layer interface 162c and the third media coupler 166c provide communication over a fiber optic fiber back to the second controller 108. It is noted that metallic transmission lines printed on a backplane and metal cable are both metallic transmission lines. For simplicity of expression, hereinafter the term metallic transmission line is used to refer to any of a variety of metal transmission lines including metallic transmission lines such as stripline or other printed or otherwise fabricated metal conductors on a printed circuit board or backplane, a metal cable such as twisted pair, or other metallic conductor.

In an embodiment, two media paths are employed to couple the second controller 108 to the second physical layer interface 162b and two media paths are employed to couple the second controller 108 to the third physical layer interface 162c. For example, in an embodiment, a first metallic transmission line couples a RX of the first controller 106 to a TX of the second physical layer interface 162b and a second metallic transmission line couples a TX of the first controller 106 to a RX of the second physical layer interface 162b. Likewise, in another embodiment, a first optical fiber couples a RX of the first controller 106 to a TX of the second physical layer interface 162b and a second optical fiber couples a TX of the first controller 106 to a RX of the second physical layer interface 162b.

In an embodiment, the first physical layer interface 162a of the first PHY chip 160a and the first media coupler 166a provide for communication over a metallic transmission line back to the network 112. In this embodiment, the second physical layer interface 162b of the second PHY chip 160b and the second media coupler 166b provide for communication over a metallic transmission line back to the first controller 106. In this embodiment, the third physical layer interface 162c of the third PHY chip 160c and the third media coupler 166c provide for communication over a metallic transmission line back to the second controller 108. In this embodiment, a portion of the medium between the combiner/splitter 110 and the network 112 and/or between the combiner/splitter 110 and the controller 106, 108 may be provided by a backplane, for example by transmission line metallic conductors and/or copper traces on a backplane of an equipment cabinet. In an embodiment, the backplane may be a printed wiring board. The backplane may further be coupled to the network 112 and/or the controllers 106, 108 by a metal cable.

It is contemplated that a variety of different PHY chips 160 may be employed to build the combiner/splitter 110. For example, different PHY chips 160 may have different capabilities and different operating requirements. The link layer interface 164 of some PHY chips 160 may support a 2-bit transmit bus and a 2-bit receive bus. Alternatively, the link layer interface 164 of some PHY chips 160 may support a 4-bit transmit bus and a 4-bit receive bus. A first type of a PHY chip 160 may transmit and receive serial data on its physical layer interface 162 at about 100 megabits per second and may transmit and receive 2-bit parallel data on its link layer interface 164 at about 50 megabits per second. The first type of PHY chip 160 may be referred to as a reduced media independent interface (RMII) PHY chip. In another embodiment, however, the PHY chips 160 may operate at different frequencies. For example, in an embodiment, the PHY chips 160 and the combiner/splitter 110 may transmit serial data at a 1 gigabit rate.

The physical layer interface 162 of the first type of PHY chip 160 may be said to operate at about 125 megahertz and may promote a 100 megabits per second serial data communication rate. The serial data communication may comprise both payload data and overhead bits such as 4B 5B encoding and other overhead bits. The link layer interface 164 of the first type of PHY chip 160 may be said to operate at about 50 megabits per second.

A second type of PHY chip 160 may transmit and receive serial data on its physical layer interface 162 at about 125 megahertz and may promote a 100 megabits per second serial data communication rate and transmit and receive 4-bit parallel data on its link layer interface 164 at about 25 megabits per second. The link layer interface 164 of the second type of PHY chip 160 may be said to operate at about 25 megabits per second.

The first type of PHY chip 160 may be implemented so as to use a single clock for both link layer transmitting and link layer receiving. In an embodiment, when the combiner/splitter 110 is comprised of the first type of PHY chip 160, the combiner/splitter 110 comprises a 50 megahertz clock that is sourced to each of the PHY chips 160. The second type of PHY chip 160 may be implemented having a link layer transmit clock input that is separate from a link layer receive clock input. When using this second type of PHY chip 160 to implement the combiner/splitter 110, communication among the link layer interfaces 164 of the PHY chips 160a, 160b, 160c may need to be buffered by first-in first-out (FIFO) buffers to adapt for differences of clocks in the PHY chips 160.

In an embodiment, a transmit output of the first link layer interface 164a of the first PHY chip 160a (network PHY chip) may be wired OR to connect to a receive input of the second link layer interface 164b of the second PHY chip 160b and to a receive input of the third link layer interface 164c of the third PHY chip 160c. The connection referred to as wired OR may be implemented in a variety of ways, including by wires that are coupled together and/or conducting traces that are connected on the surface of a printed circuit board. It is understood by those skilled in the art that digital electronic components may be designed to support fanning out an output signal to drive a plurality of inputs on other chips without degradation of the output signal, up to a defined limited number of other chips. While in FIG. 2, a single line between the first link layer interface 164a of the first PHY chip 160a is shown wired OR to single lines to each of the second link layer interface 164b of the second PHY chip 160b and the third link layer interface 164c of the third PHY chip 160c, it is understood that the number of lines may correspond to the width of the parallel data bus (the number of bits per bus) among the PHY chips 160. In an embodiment, a transmit output of the second link layer interface 164b and a transmit output of the third link layer interface 164c may be logically ORed by an OR-gate 168, and the output of the OR-gate 168 may couple into a receive input of the first link layer interface 164a.

While in FIG. 2, a single line from each of the transmit outputs of the second link layer interface 164b of the second PHY chip 160b and the third link layer interface 164c of the third PHY chip 160c is shown ORed, the number of lines and the number of OR-gates may correspond to the width of the parallel data bus (the number of bits per bus) among the PHY chips 160. Thus, for the first type of PHY chip 160, there may be two lines wired OR from the transmit portion of the first link layer interface 164a to the two receive lines of each of the second link layer interface 164b of the second PHY chip 160b and the third link layer interface 164c of the third PHY chip 160c. Likewise, for the first type of PHY chip 160, two OR-gates 168 may OR a first and second transmit line respectively of the transmit lines of the second link layer interface 164b of the second PHY chip 160b and the third link layer interface 164c of the third PHY chip 160c.

In an embodiment, the controllers 106, 108 are responsible for arranging that only one of the controllers 106, 108 transmits to the combiner/splitter 110 at any one time. For example, only one of the controllers 106, 108 normally operates in primary mode, and it is the controller 106, 108 operating in primary mode that transmits messages and/or signals to the combiner/splitter 110 while the other controller 106, 108 operating in shadow mode does not transmit messages to the combiner/splitter 110.

Figure 3:
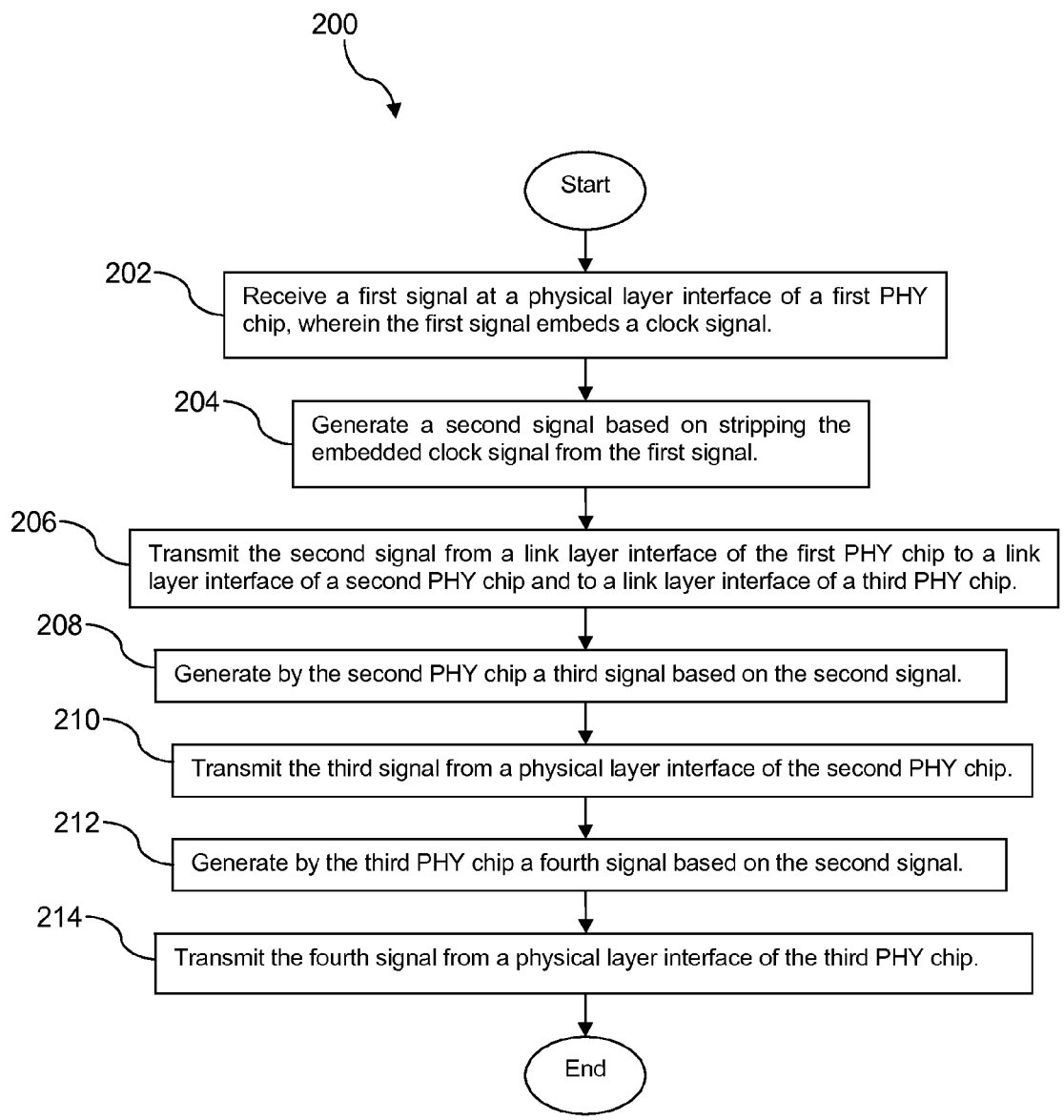
FIG. 3 is a flow chart of a method according to an embodiment of the disclosure.

Turning now to FIG. 3, a method 200 is described. At block 202, receive a first signal at a physical layer interface of a first PHY chip, wherein the first signal embeds a clock signal. For example, the first PHY chip 160a receives a first signal on the first physical layer interface 162a. The first signal may be encoded and may embed a clock signal. At block 204, generate a second signal based on stripping the embedded clock signal from the first signal. For example, the first PHY chip 160a converts the physical layer signal to a link layer signal, the second signal, in the process removing the clock signal that is embedded in the input signal. At block 206, transmit the second signal from a link layer interface of the first PHY chip to a link layer interface of a second PHY chip and to a link layer interface of a third PHY chip. For example, the first PHY chip 160a transmits the second signal from the first link layer interface 164a via a wired OR to each of the second link layer interface 164b of the second PHY chip 160b and the third link layer interface 164c of the third PHY chip 160c.

At block 208, the second PHY chip generates a third signal based on the second signal. For example, the second PHY chip 160b converts the link layer signal, the second signal, to a physical layer signal, the third signal. The third signal may conform with a physical layer protocol associated with the second physical layer interface 162b of the second PHY chip 160b. At block 210, the third signal is transmitted by a physical layer interface of the second PHY chip. For example, the second physical layer interface 162b of the second PHY chip 160b transmits the third signal to the first controller 106. At block 212, the third PHY chip generates a fourth signal based on the second signal. For example, the third PHY chip 160c converts the link layer signal, the second signal, to a physical layer signal, the fourth signal. The fourth signal may conform with a physical layer protocol associated with the third physical layer interface 162c of the third PHY chip 160c. At block 214, the fourth signal is transmitted by a physical layer interface of the third PHY chip. For example, the third physical layer interface 162c of the third PHY chip 160c transmits the third signal to the second controller 108.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic communication device, comprising:
   a first PHY chip;
   a second PHY chip;
   a third PHY chip;
   a first interface coupled to a physical layer interface of the first PHY chip;
   a second interface having a first electrical connection to a physical layer interface of the second PHY chip;
   a third interface having a second electrical connection to a physical layer interface of the third PHY chip, the second electrical connection being separate and distinct from the first electrical connection whereby messages may pass directly between the second interface and the second PHY chip, but not directly between the second interface and the third PHY chip, and messages may pass directly between the third interface and the third PHY chip, but not directly between the third interface and the second PHY chip;
   wherein a link layer interface of the first PHY chip is coupled to each of a link layer interface of the second PHY chip and a link layer interface of the third PHY chip,
   whereby the device is configured to receive a first message via the first interface and transmit the first message via the second interface and the third interface,
   whereby the device is configured to receive a second message via the second interface and transmit the second message via the first interface, the second message indicating a first controller operating in a primary mode and comprising field device state and sensor information, and
   whereby the device is configured to receive an indication via the third interface and transmit the indication via the first interface, the indication related to a second controller operating in a shadow mode.

2. The electronic communication device of claim 1, wherein at least one of the first interface, the second interface, or the third interface is coupled to a fiber optic line.

3. The electronic communication device of claim 1, wherein at least one of the first interface, the second interface, or the third interface is coupled to a metal conductor.

4. The electronic communication device of claim 3, wherein at least one of the first interface, the second interface, or the third interface is coupled to a fiber optic line.

5. The electronic communication device of claim 1, wherein the first interface receives the first message at a rate of at least 95 megabits per second.

6. The electronic communication device of claim 1, wherein the PHY chips are reduced media independent interface (RMII) PHY chips.

7. The electronic communication device of claim 1, further comprising a clock that provides an about 50 megahertz reference clock signal to each of the PHY chips.

8. The electronic communication device of claim 1, further comprising a plurality of first-in first-out buffers to adapt timing differences among the PHY chips when transmitting the first, second, and third messages.

9. The device of claim 1, wherein the indication comprises a third message indicating a second controller operating in the shadow mode.

10. A network capable of being connected to a control system, the network comprising:
    first and second redundant controllers;
    a field device;
    an electronic device configured to couple the control system to the first and second redundant controllers, the electronic device comprising:
       a first interface configured to be coupled to the control system, whereby the first interface can be addressed using a unique medium access control (MAC) address;
       a second interface;
       a first transmission line connecting the second interface to the first redundant controller;
       a third interface;
       a second transmission line connecting the third interface to the second redundant controller;
       wherein the electronic device is configured to receive a first message from the control system via the first interface and configured to transmit the first message from the electronic device to the field device via the first transmission line from the second interface to the first redundant controller and is further configured to transmit the first message from the device to the second redundant controller via the second transmission line from the third interface to the second redundant controller,
       wherein the electronic device is configured to receive a second message from the first redundant controller via the first transmission line from the first redundant controller to the second interface and configured to transmit the second message via the first interface to the control system, the second message indicating a first redundant controller operating in a primary mode and further comprising device state and sensor information of the field device,
       wherein the electronic device is configured to receive an indication via the third interface and configured to transmit indication via the first interface to the control system, the indication related to a second redundant controller operating in a shadow mode.

11. The network of claim 10, wherein at least one of the first transmission line or the third transmission line is a metal transmission line.

12. The network of claim 10, wherein at least one of the first transmission line or the second transmission line is a fiber optic line.

13. The network of claim 10, wherein the electronic device further comprises a first PHY chip, a second PHY chip, and a third PHY chip, wherein a link layer interface of each of the PHY chips couple to each other, and wherein a physical layer interface of each of the PHY chips couple to one of the first, second, and third interfaces.

14. The network of claim 13, wherein the first, second, and third interfaces of the electronic device are serial data interfaces, wherein the first message is transmitted from the first PHY chip via a 2-bit parallel data path to the second PHY chip and from the first PHY chip via a 2-bit parallel data path to the third PHY chip.

15. The network of claim 13, wherein the first, second, and third interfaces of the electronic device are serial data interfaces, wherein the first message is transmitted from the first PHY chip via a 4-bit parallel data path to the second PHY chip and from the first PHY chip via a 4-bit parallel data path to the third PHY chip.

16. The network of claim 10, wherein the network further comprises:

a second electronic device configured to couple the control system to the first and second redundant controllers, the second electronic device, comprising:
 a fourth interface configured to be coupled to the control system;
 a fifth interface;
 a third transmission line connecting the fifth interface to the first redundant controller;
 a sixth interface;
 a fourth transmission line connecting the sixth interface to the second redundant controller.

17. The network of claim 10:
wherein the first redundant controller operates in a primary role, and acts upon the received first message;
wherein the second redundant controller operates in a shadow role, and does not act upon the received first message, but monitors communications received by the first redundant controller, and executes the same controller program that the first controller executes.

18. The network of claim 10, wherein the indication comprises a third message received from the second redundant controller via the second transmission line from the second redundant controller to the third interface and configured to transmit the third message via the first interface to the control system, the third message indicating a second redundant controller operating in the shadow mode.

* * * * *